US009437020B2

(12) United States Patent
Mukhopadhyay (10) Patent No.: US 9,437,020 B2
(45) Date of Patent: Sep. 6, 2016

(54) SYSTEM AND METHOD TO CHECK THE CORRECT RENDERING OF A FONT (71) Applicant: Red Hat, Inc., Raleigh, NC (US)

(72) Inventor: Sankarshan Mukhopadhyay, West Bengal (IN)

(73) Assignee: Red Hat, Inc., Raleigh, NC (US)

( * ) Notice: Subject to any disclaimer, the term of this patent is extended or adjusted under 35 U.S.C. 154(b) by 221 days.

(21) Appl. No.: 14/139,337

(22) Filed: Dec. 23, 2013

(65) Prior Publication Data
US 2015/0178966 A1 Jun. 25, 2015

(51) Int. Cl.
G06F 17/30 (2006.01)
G06T 11/20 (2006.01)
G06F 17/21 (2006.01)
G06F 17/22 (2006.01)

(52) U.S. Cl.
CPC ........... G06T 11/203 (2013.01); G06F 17/214 (2013.01); G06F 17/2217 (2013.01)

(58) Field of Classification Search
CPC . G06F 17/214; G06F 17/2217; G06T 7/002; G06T 11/203; G06T 11/0001
USPC ....... 345/467, 170, 442, 443, 471, 593, 419; 715/200, 221, 222, 780, 255, 269, 243; 382/309–311, 100, 175; 709/206; 713/150; 707/694
See application file for complete search history.

(56) References Cited

U.S. PATENT DOCUMENTS

| 5,301,267 A * | 4/1994 | Hassett | G06T 11/203 345/170 |
| 5,598,520 A * | 1/1997 | Harel | G06T 11/203 345/469 |
| 5,684,510 A * | 11/1997 | Brassell | G06T 11/203 345/443 |
| 5,805,783 A * | 9/1998 | Ellson | G06T 15/20 345/419 |
| 5,857,067 A * | 1/1999 | Hassett | G06T 11/203 345/442 |

(Continued)

FOREIGN PATENT DOCUMENTS

| JP | 2002298143 | 10/2002 | |
| WO | WO 2009070142 A1 * | 4/2009 | ............. G06F 17/30 |

OTHER PUBLICATIONS

Vadim Okun, "Aho-Corasick", in Dictionary of Algorithms and Data Structures [online], Vreda Pieterse and Paul E. Black, eds. Sep. 21, 2006; 1 page, (accessed Jan. 2, 2014) Available from: http://www.nist.gov/dads/HTML/ahoCorasick.html.

(Continued)

Primary Examiner — Frantz Coby
(74) Attorney, Agent, or Firm — Haynes and Boone, LLP (57) ABSTRACT Systems and methods for determining a correct rendering of a candidate entity are provided. An example method includes identifying a first combined image including an image of a reference entity. The reference entity is bound by a first grid including one or more grid cells. The method further includes rendering a second combined image including an image of a candidate entity. The candidate entity is bound by a second grid including one or more grid cells. The method also includes identifying reference and candidate patterns. The method further includes mapping corresponding grid cell patterns of the reference and candidate entities and determining a variance measurement between the mapped grid cell patterns of the reference and candidate entities. The method also includes determining, based on the variance measurement, whether the candidate entity is a correct rendering in accordance with the reference entity.

20 Claims, 5 Drawing Sheets

(56) References Cited

U.S. PATENT DOCUMENTS

| | | | |
|---|---|---|---|
| 6,253,374 B1* | 6/2001 | Dresevic | G06F 21/50 717/126 |
| 6,337,924 B1* | 1/2002 | Smith | G06K 9/6828 382/175 |
| 7,310,769 B1* | 12/2007 | Dash | G06F 17/2217 715/269 |
| 7,478,325 B2* | 1/2009 | Foehr | G06F 17/214 715/243 |
| 7,505,040 B2* | 3/2009 | Stamm | G06T 11/203 345/467 |
| 7,573,476 B2* | 8/2009 | Matskewich | G09G 5/246 345/467 |
| 7,598,954 B2 | 10/2009 | Brown et al. | |
| 7,720,318 B1 | 5/2010 | Phinney | |
| 7,765,477 B1* | 7/2010 | Dash | G06F 17/214 715/255 |
| 7,869,090 B2* | 1/2011 | Wang | H04N 1/00864 358/1.11 |
| 8,175,388 B1 | 5/2012 | Fisher | |
| 8,379,027 B2* | 2/2013 | Lim | G06T 7/0002 345/467 |
| 8,411,956 B2 | 4/2013 | McGatha et al. | |
| 8,416,243 B2* | 4/2013 | Plummer | G06F 17/214 345/467 |
| 8,429,397 B2* | 4/2013 | Imai | G06F 21/608 713/150 |
| 8,594,384 B2* | 11/2013 | Pnueli | G06T 7/0002 382/112 |
| 8,624,900 B2* | 1/2014 | Jones | G09G 5/28 345/471 |
| 8,671,342 B2* | 3/2014 | DeLuca | G06F 17/214 709/206 |
| 8,689,101 B2* | 4/2014 | Fux | G06F 17/214 715/200 |
| 8,941,663 B2* | 1/2015 | Liao | G06F 17/214 345/467 |
| 9,164,874 B1* | 10/2015 | Tomay | G06F 11/366 |
| 2004/0001606 A1* | 1/2004 | Levy | G06T 1/0021 382/100 |
| 2006/0017946 A1* | 1/2006 | Peiro | G06F 17/214 358/1.11 |
| 2006/0106593 A1 | 5/2006 | Shultz et al. | |
| 2010/0150433 A1* | 6/2010 | Wang | H04N 1/00864 382/162 |
| 2013/0027406 A1* | 1/2013 | Liu | G06F 17/214 345/467 |
| 2015/0235393 A1* | 8/2015 | Wong | G06T 11/001 345/593 |

OTHER PUBLICATIONS

Sun Wu; A Fast Algorithm for Multi-Pattern Searching, Department of Computer Science, Chung-Cheng University, Chia-Yi Taiwan, May 1994, pp. 1-11, University of Arizona, Tucson, AZ 85721, retrieved from http://webglimpse.net/pubs/TR94-17.pdf.

Sitaram Ramachandrula et al.; PaperDiff: A Script Independent Automatic Method for Finding the Text Differences Between Two Document Images; Hewlett-Packard Labs India, Bangalore, India; Sep. 16-19, 2008; pp. 585-590, retrieved Jan. 2, 2014 from http://ieeexplore.ieee.org/xpl/login.jsp?tp=&arnumber=4670009&url=http%3A%2F%2Fieeexplore.ieee.org%2Fxpls%2Fabs_all.jsp%3Farnumber%3D4670009.

Badreddine Khelifi et al., Unsupervised Categorization of Hetergeneous Text Images Based on Fractals, REGIM: Research Group on Intelligent Machines, University of Sfax, ENIS, Department of Electrical Engineering, BPW—3038, Sfax, Tunisia, Dec. 8-11, 2008; 4 pages, retrieved Jan. 2, 2014 from http://ieeexplore.ieee.org/xpl/login.jsp?tp=&arnumber=4761176&url=http%3A%2F%2Fieeexplore.ieee.org%2Fxpls%2Fabs_all.jsp%3Farnumber%3D4761176.

C.Y. Suen et al., Evaluation of Fonts for Digital Publishing and Display; CENPARMI, Concordia University, Canada; Sep. 18-21, 2011, pp. 1424-1436, retrieved Jan. 2, 2014 from http://ieeexplore.ieee.org/xpl/login.jsp?tp=&arnumber=6065545&url=http%3A%2F%2Fieeexplore.ieee.org%2Fxpls%2Fabs_all.jsp%3Farnumber%3D6065545.

* cited by examiner

FIG. 1

|   | 000 | 001 | 002 | 003 | 004 | 005 | 006 | 007 |
|---|---|---|---|---|---|---|---|---|
| 0 | NUL | DLE | SP | 0 | @ | P | ` | p |
| 1 | SOH | DC1 | ! | 1 | A | Q | a | q |
| 2 | STX | DC2 | " | 2 | B | R | b | r |
| 3 | ETX | DC3 | # | 3 | C | S | c | s |
| 4 | EOT | DC4 | $ | 4 | D | T | d | t |
| 5 | ENQ | NAK | % | 5 | E | U | e | u |
| 6 | ACK | SYN | & | 6 | F | V | f | v |
| 7 | BEL | ETB | ' | 7 | G | W | g | w |
| 8 | BS | CAN | ( | 8 | H | X | h | x |
| 9 | HT | EM | ) | 9 | I | Y | i | y |
| A | LF | SUB | * | : | J | Z | j | z |
| B | VT | ESC | + | ; | K | [ | k | { |
| C | FF | FS | , | < | L | \ | l | \| |
| D | CR | GS | - | = | M | ] | m | } |
| E | SO | RS | . | > | N | ^ | n | ~ |
| F | SI | US | / | ? | O | _ | o | DEL |

SYSTEM AND METHOD TO CHECK THE CORRECT RENDERING OF A FONT

FIELD OF DISCLOSURE

The present disclosure generally relates to computing systems, and more particularly to testing the rendering of a font.

BACKGROUND

As computer systems are deployed into more environments around the world, it becomes imperative that they support a wider range of interface languages. A computer system may support a wide variety of languages and fonts. Fonts are an important component of language technology. A font may be based on a Unicode character code chart provided by the Unicode Consortium. The Unicode Consortium is a non-profit corporation devoted to developing, maintaining, and promoting software internationalization standards and data, particularly the Unicode Standard, which specifies the representation of text in modern software products and standards.

BRIEF SUMMARY

This disclosure relates to an automated technique to check the correct rendering of a candidate entity in accordance with a reference entity using pattern matching and comparing attributes of the candidate entity and reference entity. Methods, systems, and techniques for determining a correct rendering of a candidate entity of a candidate font set are disclosed.

According to an embodiment, a method of determining a correct rendering of a candidate entity includes identifying a first combined image including an image of a reference entity. The reference entity is bound by a first grid including one or more grid cells. The method also includes identifying a reference pattern for the reference entity in accordance with filled, partially filled, and empty grid cell content representing the reference entity within the first grid. The method further includes rendering a second combined image including an image of a candidate entity. The candidate entity is bound by a second grid including one or more grid cells. The method also includes identifying a candidate pattern for the candidate entity in accordance with filled, partially filled, and empty grid cell content representing the candidate entity within the second grid. The method further includes mapping corresponding grid cell patterns of the reference and candidate entities. The method also includes determining a variance measurement between the mapped grid cell patterns of the reference and candidate entities. The method further includes determining, based on the variance measurement, whether the candidate entity is a correct rendering in accordance with the reference entity.

According to another embodiment, a system for determining a correct rendering of a candidate entity includes a rendering engine that renders a first combined image including an image of a reference entity and that renders a second combined image including an image of a candidate entity. The reference entity is bound by a first grid including one or more grid cells, and the candidate entity is bound by a second grid including one or more grid cells. The system also includes a pattern module that identifies a reference pattern for the reference entity in accordance with filled, partially filled, and empty grid cell content representing the reference entity within the first grid. The pattern module also identifies a candidate pattern for the candidate entity in accordance with filled, partially filled, and empty grid cell content representing the candidate entity within the second grid. The pattern module also maps corresponding grid cell patterns of the reference and candidate entities. The system further includes a validation module that determines a variance measurement between the mapped grid cell patterns of the reference and candidate entities and determines, based on the variance measurement, whether the candidate entity is a correct rendering in accordance with the reference entity.

According to another embodiment, a non-transitory machine-readable medium includes a plurality of machine-readable instructions that when executed by one or more processors are adapted to cause the one or more processors to perform a method including: identifying a first combined image including an image of a reference entity, where the reference entity is bound by a first grid including one or more grid cells; identifying a reference pattern for the reference entity in accordance with filled, partially filled, and empty grid cell content representing the reference entity within the first grid; rendering a second combined image including an image of a candidate entity, where the candidate entity is bound by a second grid including one or more grid cells; identifying a candidate pattern for the candidate entity in accordance with filled, partially filled, and empty grid cell content representing the candidate entity within the second grid; mapping corresponding grid cell patterns of the reference and candidate entities; determining a variance measurement between the mapped grid cell patterns of the reference and candidate entities; and determining, based on the variance measurement, whether the candidate entity is a correct rendering in accordance with the reference entity.

BRIEF DESCRIPTION OF THE DRAWINGS

The accompanying drawings, which form a part of the specification, illustrate embodiments of the invention and together with the description, further serve to explain the principles of the embodiments. It should be appreciated that like reference numerals may be used to identify like elements or similarly functioning elements illustrated in one or more of the figures. The drawing in which an element first appears is generally indicated by the left-most digit in the corresponding reference number.

DETAILED DESCRIPTION

I. Overview
II. Example System Architecture
   A. Render the Entities
      1. Reference Entity and its Pattern
      2. Candidate Entity and its Pattern B. Digitize the Combined Images
C. Match Patterns of a Reference Entity and a Candidate Entity
D. Compare Attributes of Reference and Candidate Entities
III. Complete Candidate Font Set
IV. Example Method
V. Example Computing System I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

A conventional method of comparing a reference image of a glyph or text with an image generated by a text rendering engine typically depends on human intervention. In an example, visual cues may be manually compared by a reviewer and thereafter inferences may be drawn on whether the two images are alike in all respects. This system typically uses an informed reviewer who can visually segregate all points of dissimilarity and provide an informed conclusion at the end. Although it may be unnecessary for the reviewer to possess fluency in the language, it requires a highly tuned ability to be able to distinguish between two images and note similarities.

Further, different fonts may be used or desired by users of a text editor. To ensure that a candidate font set complies with the rules of the language, the characters of the candidate font set may be rendered and the reviewer may manually determine one by one whether the characters of the candidate font set on the screen are correct (e.g., a particular character looks how it is expected to look). For example, an "R" in the English language has a particular shape and is identifiable by users based on how an "R" should look like. As discussed, the Unicode consortium publishes a reference font set and the reviewer may compare the characters of the candidate font set with the characters of the reference font set to determine whether the candidate font set complies with the reference font set (e.g., Unicode character code chart provided by the Unicode Consortium). Although the letter "R" rendered in different fonts may look different and vary in style, the letter "R" has absolute basic elements of the character that extends to any font and is consistent.

This conventional method has some disadvantages. For example, it can be difficult for a reviewer who has not learned to read a language to examine text written in the language and pick out even the most egregious typesetting errors. Further, development and testing of the text may be time-consuming and expensive. A system to assist or automate the text rendering engine testing may be of considerable value. The system may determine whether the candidate font set complies with a reference font set.

In an embodiment, a method of determining a correct rendering of a candidate entity includes identifying a first combined image including an image of a reference entity. The reference entity is bound by a first grid including one or more grid cells. The method also includes identifying a reference pattern for the reference entity in accordance with filled, partially filled, and empty grid cell content representing the reference entity within the first grid. The method further includes rendering a second combined image including an image of a candidate entity. The candidate entity is bound by a second grid including one or more grid cells. The method also includes identifying a candidate pattern for the candidate entity in accordance with filled, partially filled, and empty grid cell content representing the candidate entity within the second grid. The method further includes mapping corresponding grid cell patterns of the reference and candidate entities. The method also includes determining a variance measurement between the mapped grid cell patterns of the reference and candidate entities. The method further includes determining, based on the variance measurement, whether the candidate entity is a correct rendering in accordance with the reference entity.

In such an embodiment, pattern matching between the image including the reference entity and the image including the candidate entity is performed. When applied to images, the pattern matching may remove the necessity for the reviewer to be able to identify all points of similarity and/or dissimilarity between the reference entity and candidate entity. Rather, the reviewer may be presented with an image identifying the Locii of similarity and can utilize the number of points of similarity to be able to review a rendered image.

II. Example System Architecture

Figure 1:
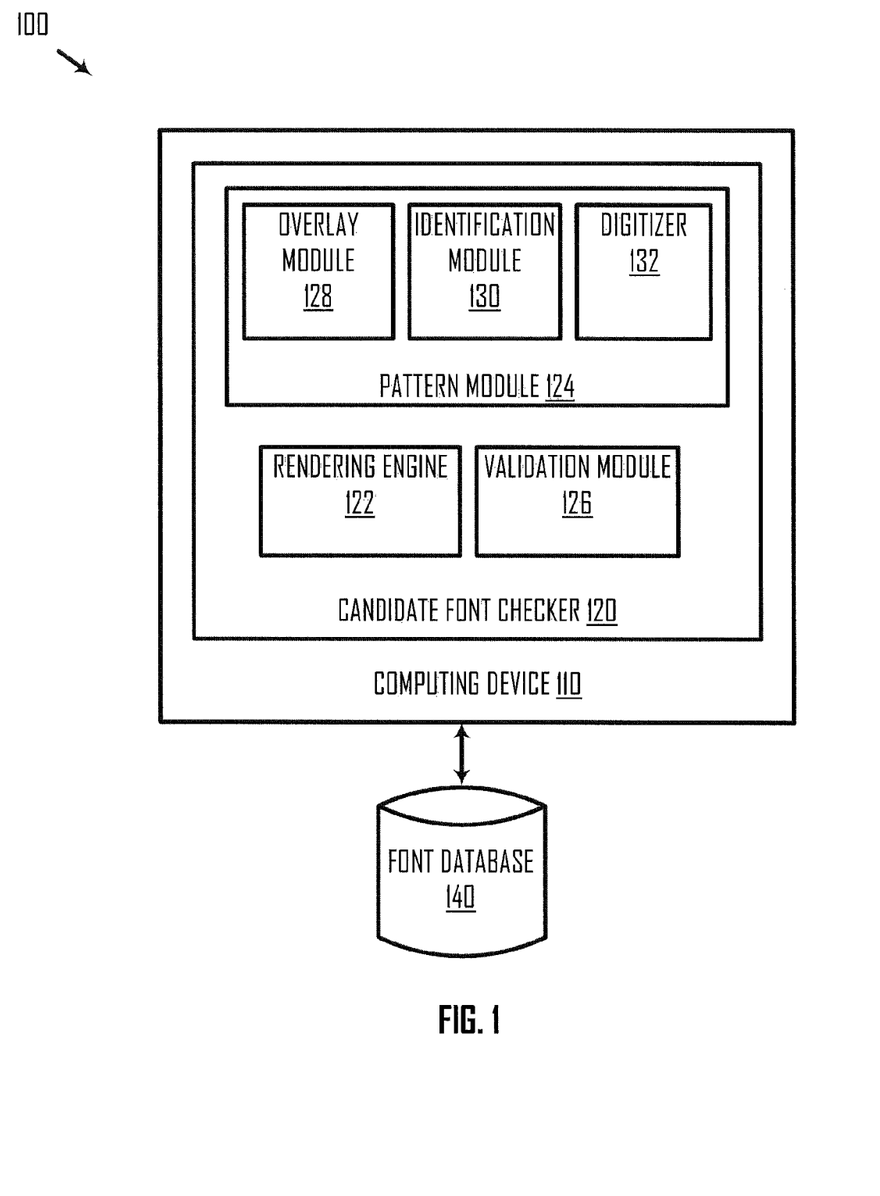
FIG. 1 is a simplified block diagram illustrating a system for determining a correct rendering of a candidate entity of a candidate font set, according to an embodiment.

FIG. 1 is a simplified block diagram illustrating a system 100 for determining a correct rendering of a candidate entity of a candidate font set, according to an embodiment. System 100 may enable a font developer to input a candidate font set and test it to determine whether the candidate font set complies with a reference font set. System 100 may also provide the font developer with a clear variance measurement between the candidate font set and the reference font set.

Candidate font checker 120 may execute on a computing device 110. Computing device 110 may be any computing device such as a workstation (e.g., client device), mobile device (e.g., a mobile phone, personal digital assistant, tablet, and laptop), computer, server, game console, set-top box, kiosk, embedded system, or other device having at least one processor and memory. Computing device 110 is coupled to a font database 140 that stores data about the reference font set and/or the candidate font set. Font database 140 may be stored at computing device 110 or at another computing device that is coupled to computing device 110 over a network.

Candidate font checker 120 may use a pattern matching technique to map corresponding cell patterns and deduce whether the candidate font set is rendered in accordance with the reference font set. Additionally, an attribute comparing technique may be used to identify points of similarity and dissimilarity, which can be used by the reviewer when producing the final report. Candidate font checker 120 includes a rendering engine 122, a pattern module 124, and a validation module 124.

A. Render the Entities

Rendering engine 122 renders one or more entities. An entity may be, for example, a character (e.g., text character), image, shape, or any other symbol capable of being rendered and used in the present disclosure. A character may also be referred to as a glyph. In an example, computing device 110 is executing a paint application (not shown) and rendering engine 122 renders one or more images for display in the paint application. In another example, computing device 110 is executing a word processor (not shown) and rendering engine 122 renders one or more text characters for display in the word processor. In another example, rendering engine 122 renders one or more text characters to a command line of computing device 110.

Figure 2:
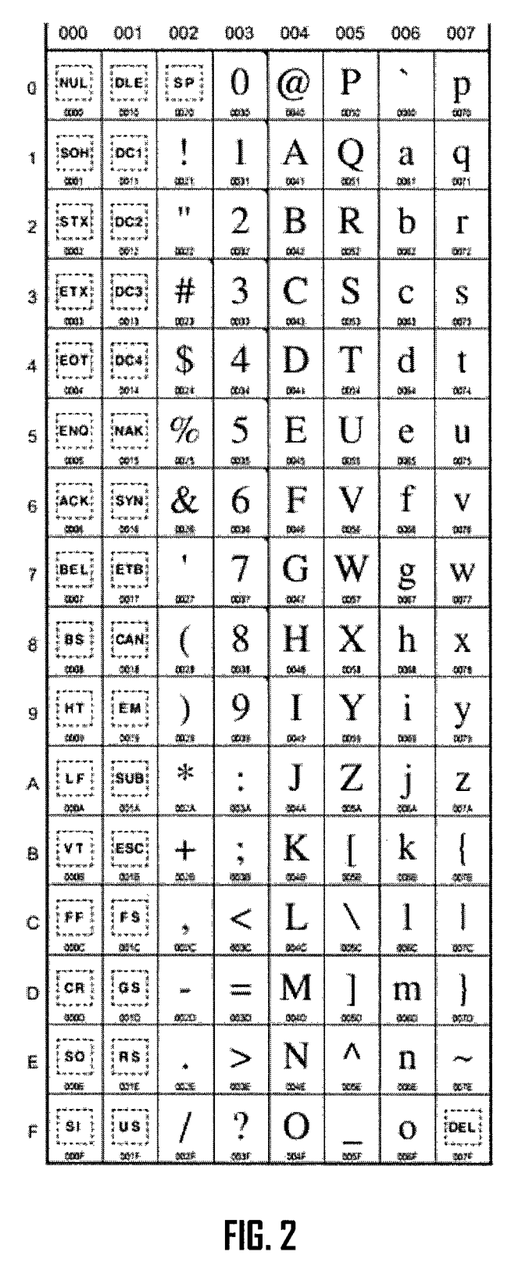
FIG. 2 is an illustration of a reference font set, according to an embodiment.

The user may select a reference font set to compare with the candidate font set. In an example, the user selects the basic Latin script provided by the Unicode Consortium as the reference font set. FIG. 2 is an example chart of the basic Latin script provided by the Unicode Consortium, according to an embodiment. Although the disclosure may describe an entity as being a text character, it should be understood that this is not intended to be limiting. As discussed above, an entity may also be an image, shape, or any other symbol capable of being rendered and used in the present disclosure. The example chart in FIG. 2 includes multiple reference entities that can be compared with candidate entities of the candidate font set.

Pattern module 124 may identify a pattern for each entity of the reference font set and candidate font set. Pattern module 124 includes overlay module 128, identification module 130, and digitizer 132. In an embodiment, overlay module 128 overlays an image including one or more entities on a grid and determines a combined image including the image of the one or more entities overlaid on the grid. The grid enables the image to be broken down in terms of an entity and its attributes as described below. An attribute may include, for example, font family, font weight, font width, font style, font size, font adjustment, font relative sizing, font stretch, kerning, and ligatures. The grid helps to more easily distinguish an entity's pattern so that pattern module 124 may identify patterns in grid cells by, for example, determining whether particular grid cells are filled, partially filled, or empty.

Although overlay module 128 may be described as overlaying the image of the entity on a grid, it should also be understood that other embodiments in which overlay module 128 overlays a grid on the image of the entity and determines a combined image including the grid overlaid on the image of the entity are within the scope of the disclosure. Digitizer 132 may digitize the combined image. Digitizer 132 may be, for example, an optical character recognition program.

In an embodiment, identification module 130 identifies a pattern for the entity. For brevity, the disclosure may describe rendering engine 122 as rendering one entity at a time. It should be understood, however, that rendering engine 122 may render multiple entities at a time.

1. Reference Entity and its Pattern

Figure 3A:
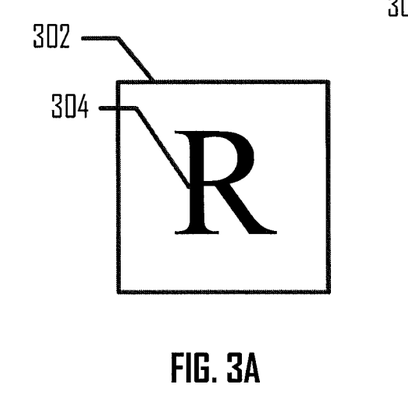
FIGS. 3A-3B illustrate an example of a combined image for a reference entity "R" from the example chart illustrated in FIG. 2, according to an embodiment.
Figure 3B:
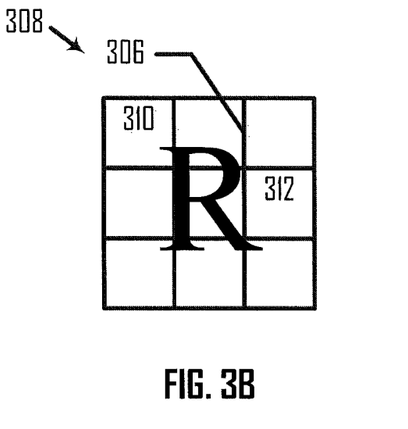

FIGS. 3A-3B illustrate an example of a combined image for a reference entity "R" from the example chart of the basic Latin script illustrated in FIG. 2, according to an embodiment. For the reference font set, rendering engine 122 may render an image 302 of a reference entity "R" 304. In an example, an image of one or more reference entities is produced by a source known to produce a correct image of one or more entities corresponding to the one or more reference entities. In such an example, the image of the one or more reference entities may be produced by the Unicode Consortium.

In another example, the image of the one or more reference entities includes references entities that are used as a baseline font by the user for comparison. In such an example, the image of the one or more reference entities may be an image of a candidate font set that the user initially submitted and wants to compare against a second candidate font set. The second candidate font set may include improvements that the user made to the initially submitted candidate font set.

Overlay module 128 may overlay image 302 of reference entity 304 on a grid 306 and determine a combined image 308 including image 302 of reference entity 304 overlaid on grid 306. In an example, identification module 130 identifies combined image 308 including image 302 of reference entity 304, where reference entity 304 is bound by grid 306 including one or more grid cells. In another example, combined image 308 is bound by grid 306. Combined image 308 may include one or more images that includes one or more reference entities.

Identification module 130 may identify a reference pattern for reference entity 304 in accordance with filled, partially filled, and empty grid cell content representing reference entity 304 within grid 306. Grid cell 310 of grid 306 is partially filled, and grid cell 312 of grid 306 is empty. Combined image 308 may be stored in font database 140 in the form of filled, partially filled, and empty grid cells that correspond to the pattern of reference entity 304. If the image of the one or more reference entities is produced by a source known to produce a correct image of one or more entities corresponding to the one or more reference entities, the reference pattern identified by identification module 130 may correspond to a valid pattern of reference entities.

In an example, the data is also stored with relevant metadata about the script, font family, and the version of rendering engine 122 used to render reference entity 304. This process may be performed for each of the reference entities in the reference font set (e.g., in the example chart illustrated in FIG. 2). The next time that the user desires to use the example chart illustrated in FIG. 2 as a reference font set, the pattern of the reference entities may already be stored in font database 140. As such, the stored pattern may be used rather than perform the process of overlaying and identifying the reference pattern as described above.

2. Candidate Entity and Its Pattern

Figure 4A:
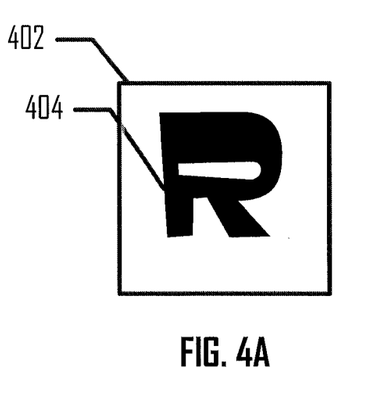
FIGS. 4A-4B illustrate an example of a combined image for a candidate entity "R," according to an embodiment.
Figure 4B:
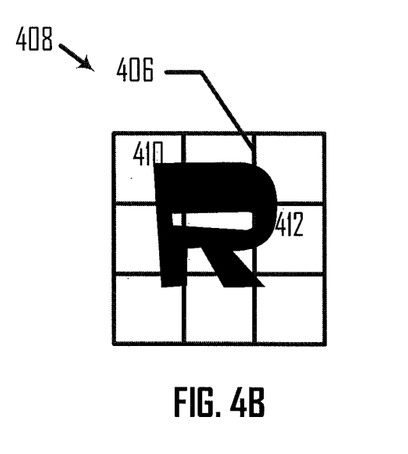

FIGS. 4A-4B illustrate an example of a combined image for a candidate entity "R" 404, according to an embodiment. The user may submit a candidate font set including the candidate entity to determine whether the candidate entity is a correct rendering in accordance with a corresponding reference entity in the reference font set. A candidate entity corresponds to a reference entity when the candidate entity is the equivalent entity (e.g., text character or image) of the reference entity in the reference font set. In the examples illustrated in FIGS. 3A-3B and 4A-4B, candidate entity 404 corresponds to reference entity 304.

For the candidate font set, rendering engine 122 may render an image 402 of a candidate entity "R" 404. Overlay module 128 may overlay image 402 of candidate entity 404 on a grid 406 and determine a combined image 408 including image 402 of candidate entity 404 overlaid on grid 406. In an example, identification module 130 identifies combined image 408 including image 402 of candidate entity 404, where candidate entity 404 is bound by grid 406 including one or more grid cells. In another example, combined image 408 is bound by grid 406. Combined image 408 may include one or more images that includes one or more candidate entities.

Identification module 130 may identify a candidate pattern for candidate entity 404 in accordance with filled, partially filled, and empty grid cell content representing candidate entity 404 within grid 406. Grid cells 410 and 412 of grid 406 are partially filled and there are no empty grid cells in combined image 408. Combined image 408 may be stored in font database 140 in the form of filled, partially filled, and empty grid cells that correspond to the pattern of candidate entity 404. In an example, the data is also stored with relevant metadata around the script, font family, and the version of rendering engine 122 used to render candidate entity 404. This process may be performed for each of the candidate entities in the candidate font set.

Font database 140 may enable minute variations between the reference and candidate patterns to be searched, identified, and displayed with annotations. The next time that the user desires to use the candidate font set (as a reference font set or a candidate font set), the pattern of the candidate entities may already be stored in font database 140. As such, the stored pattern may be used rather than perform the process of overlaying and identifying the candidate pattern as described above.

B. Digitize the Combined Images

Digitizer 132 may digitize the combined images. In an embodiment, digitizer 132 is an Optical Character Recognition program that identifies the digitized form of an entity. In such an embodiment, digitizer 132 may identify a digitized form of reference entity 304 in combined image 308 in FIG. 3 and a digitized form of candidate entity 404 in combined image 408 in FIG. 4. Digitizer 132 may digitize combined images 308 and 408 such that they are digitized images. Additionally, the digitized combined images may enable validation module 126 to generate specific measurements of variance for each of the reference font set and candidate font set in isolation.

Based on the digitization of a combined image, the digitized combined image may acquire noise or other distortion as it is being manipulated or stored. Digitizer 132 may estimate a noise of the digitized form of an entity and determine, based on the estimation of noise, whether the digitized form of the entity is useful. If the noise exceeds a threshold, the digitized form of the entity may not be useful to match the entity's pattern with another entity's pattern. If the noise does not exceed the threshold, the digitized form of the entity may be useful to match the entity's pattern with another entity's pattern.

C. Match Patterns of a Reference Entity and a Candidate Entity

In an embodiment, identification module 130 maps corresponding grid cell patterns of the reference and candidate entities. In an example, identification module 130 identifies reference entity 304 in combined image 308 and identifies candidate entity 404 in combined image 408. Identification module 130 may match the reference pattern of reference entity 304 with the corresponding candidate pattern of candidate entity 404. Identification module 130 may match the patterns to ensure that a reference entity representing an "R" is being compared to a candidate entity that also represents an "R" (as opposed to another character).

For simplicity, in FIGS. 3B and 4B, combined image 308 is illustrated as including one reference entity and combined image 408 is illustrated as including one candidate entity. This is not intended to be limiting, and these combined images may include multiple entities. In such a case, identification module 130 may implement a search string technique that locates the entities of a finite set of strings within an input text and a multi-pattern matching technique that matches patterns. In an example, identification module 130 identifies individual reference text characters in a combined image including one or more reference text characters and identifies individual candidate text characters in a combined image including one or more candidate text characters. Identification module 130 may identify a reference entity that corresponds to a candidate entity when the pattern of the reference entity matches the pattern of the candidate entity. In an example, identification module 130 identifies individual reference text characters in a combined image including one or more reference text characters and identifies each of their corresponding candidate text characters in a combined image including one or more candidate text characters. Similarly, identification module 130 may identify a candidate entity that corresponds to a reference entity when the pattern of the candidate entity matches the pattern of the reference entity. In an example, identification module 130 identifies individual candidate text characters in a combined image including one or more candidate text characters and identifies each of their corresponding reference text characters in a combined image including one or more reference text characters. In this way, rather than take one input character and thereafter attempt to locate it within a given set, identification module 130 may match all input character sets against the entire given set.

In an example, identification module 130 implements the Aho-Corasick string matching technique, which locates the occurrence of a particular character within a given set of characters (including the reference font set and candidate font set) and matches all of the patterns simultaneously. The Aho-Corasick string matching technique constructs a finite state machine in the form of a trie and creates additional links between various internal nodes. The additional links facilitate the fast transitions between any paths where there is a fail in pattern matches thus eliminating the need for back-tracking. The usage of the word "pattern" in relation to Aho-Corasick may be limited to the form or shape of the entity.

In another example, identification module 130 implements the Boyer-Moore technique, which preprocesses the string being searched for (e.g., the pattern), but not the string being searched in (e.g., the text). The Boyer-Moore technique is well-suited for applications in which the pattern either is much shorter than the text or persists across multiple searches and also uses information gathered during the preprocess step to skip sections of the text, resulting in a lower constant factor than many other string algorithms. The Boyer-Moore technique may run faster as the pattern length increases.

Although grids 306 and 406 are illustrated as being approximately the same size, this is not intended to be limiting. Grids 306 and 406 may be of different sizes and identification 130 may determine a sizing of the grid cells to determine which grid cells to map to each other.

D. Compare Attributes of Reference and Candidate Entities

System 100 may compare the contents of the grid cells bound by the row-column structure of grids 306 and 406. For example, if the pattern for a reference entity represented by the contents of one or more grid cells within grid 306 is similar to the pattern for a candidate entity represented by the contents of one or more grid cells within grid 406, the attributes of the reference and candidate entities may be compared to determine whether they match. The matching of the attributes may be thought of as "double verification" that the candidate entity is a correct rendering in accordance with the reference entity. The two-step match technique may eliminate chances of false positives, which is a well-known issue in such systems of digitized character recognition.

The output of the processing from the pattern matching may be used as input into validation module 126. In an embodiment, validation module 126 determines a variance measurement between the mapped grid cell patterns of the reference and candidate entities. Validation module 126 may determine, based on the variance measurement, whether the candidate entity is a correct rendering in accordance with the reference entity.

In an embodiment, validation module 126 extracts one or more attributes from combined image 408 in accordance with the candidate pattern. Validation module 126 may also extract one or more attributes from combined image 308 in accordance with the reference pattern. The extracted attributes may be stored in font database 140. Font database 140 may enable minute variations between the attributes to be searched, identified, and displayed with annotations. The extracted attributes of the reference pattern forms the basis on which other candidate fonts sets may be compared. An attribute may include, for example, font family, font weight, font width, font style, font size, font adjustment, font relative sizing, font stretch, kerning, and ligatures.

In an example, validation module 126 may take the reference pattern of the reference entity and the candidate pattern of the candidate entity and map against the known attributes for the reference and candidate entities. In an embodiment, to determine the variance measurement, validation module 126 may overlay one of the combined images over the other combined image. In an example, validation module 126 overlays combined image 308 over combined image 408. In another example, validation module 126 overlays combined image 408 over combined image 308. Validation module 126 may compare, in accordance with the overlaid image, the one or more extracted attributes from combined image 308 with the one or more extracted attributes from combined image 408. When a combined image is overlaid on the other combined image, validation module 126 may map the similarities and/or dissimilarities using the extracted attributes. If the compared attributes satisfy a threshold of similarity, the candidate entity may be determined to be a correct rendering in accordance with the reference entity.

If the attributes of the reference and candidate entities are determined to match, it may be stated with a high degree of confidence that the reference and candidate entities are similar and from the same family of fonts. The font family property specifies the font for an entity. The font-family property can hold several font names as a "fallback" system. In an example, if an application (e.g., browser or word processor) does not support a first font in a font family, the application may tries the next font in the font family. Two types of font family names are a family-name, which is the name of a font-family (e.g., "Times", "Courier", "Arial", etc.), and generic-family, which is the name of a generic-family (e.g., "Serif", "Sans-serif", "Cursive", "Fantasy", "Fonospace", etc.).

If the compared attributes do not satisfy the threshold of similarity, the candidate entity may be determined to not be a correct rendering in accordance with the reference entity. A high degree of variance between the compared attributes may also indicate that the entity represented by the candidate entity is actually different from the entity represented by the reference entity.

In an example, validation module 126 identifies one or more points of similarity between the reference and candidate patterns in accordance with the comparison. In such an example, validation module 126 may identify the maximum possible points of similarity between the reference and candidate patterns in accordance with the attribute comparison. In another example, validation module 126 identifies one or more points of dissimilarity between the reference and candidate patterns in accordance with the comparison. In such an example, validation module 126 may identify the maximum possible points of dissimilarity between the reference and candidate patterns in accordance with the attribute comparison.

Validation module 126 may implement the Locii algorithm, which measures variances. The Locii algorithm is typically used in geological surveys to measure the differences in surveyed geological areas and to obtain a map of the topology of the area. The Locii algorithm may be run on available map images to find minor differences in patterns.

In an embodiment, the Locii algorithm used by validation module 126 uses a canopy clustering model as a preprocessor to a k-means clustering, which is generally used to arrive at solutions to "nearest neighbor" problems in pattern analysis. In such an embodiment, validation module 126 may use a linear classifier to obtain specific and accurate measurements of variations in the candidate font set against the reference font set. Validation module 126 may provide a score ranking in terms of how much variation exists between the reference font set and candidate font set. Candidate font checker 120 may prepare a report in accordance with the determination of whether one or more candidate entities is a correct rendering in accordance with their corresponding reference entity.

III. Complete Candidate Font Set

The candidate font set may include letters of an alphabet of a language, and a word in the language may include a subset of a set of letters. In an example, combined image 308 includes an image of a reference font set including one or more reference entities and combined image 408 includes an image of a candidate font set including one or more candidate entities. The reference font set may include text characters of an alphabet of the language. For each text character of the alphabet, validation module 126 may determine whether the respective text character of the alphabet has a corresponding candidate entity in the candidate font set. When a text character of the alphabet is determined to not have a corresponding candidate entity in the candidate font set, candidate font checker 120 may prepare a report indicating that the candidate font set is incomplete. In an example, the reference font set may include the English alphabet. If the candidate font set does not include a letter for each letter in the English alphabet, the candidate font set is incomplete and candidate font checker 120 may prepare a report indicating so.

As discussed above and further emphasized here, FIGS. 1, 2, 3A-3B, and 4A-4B are merely examples, which should not unduly limit the scope of the claims. For example, it should be understood that one or more modules (e.g., pattern module 124, overlay module 128, identification module 130, digitizer 132, validation module 126, and rendering engine 122) in FIG. 1 may be combined with another module. In an example, at least one of overlay module 128 and identification module 130 are combined into one module. It should also be understood that one or more modules in FIG. 1 may be separated into more than one module. In an example, identification module 130 is split into a first identification module and a second identification module (not shown). The first identification module may be associated with a reference font set and the second identification module may be associated with a candidate font set.

In an embodiment, candidate font checker 120 is a stand-alone application that a user installs on computing device 110 and uses. Additionally, components of candidate font checker 120 in FIG. 1 may reside in a machine different from that shown in FIG. 1. Computing device 110 may be coupled to a network and access candidate font checker 120 via the network. The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

For example, in an embodiment, candidate font checker 120 is coupled to a network and is implemented as a web service (e.g., software as a service) that is provided to font developers. A font developer may subscribe to candidate font checker 120 and load fonts into candidate font checker 120, which provides an automated technique to determine whether one or more candidate entities is a correct rendering in accordance with their corresponding reference entity.

IV. Example Method

Figure 5:
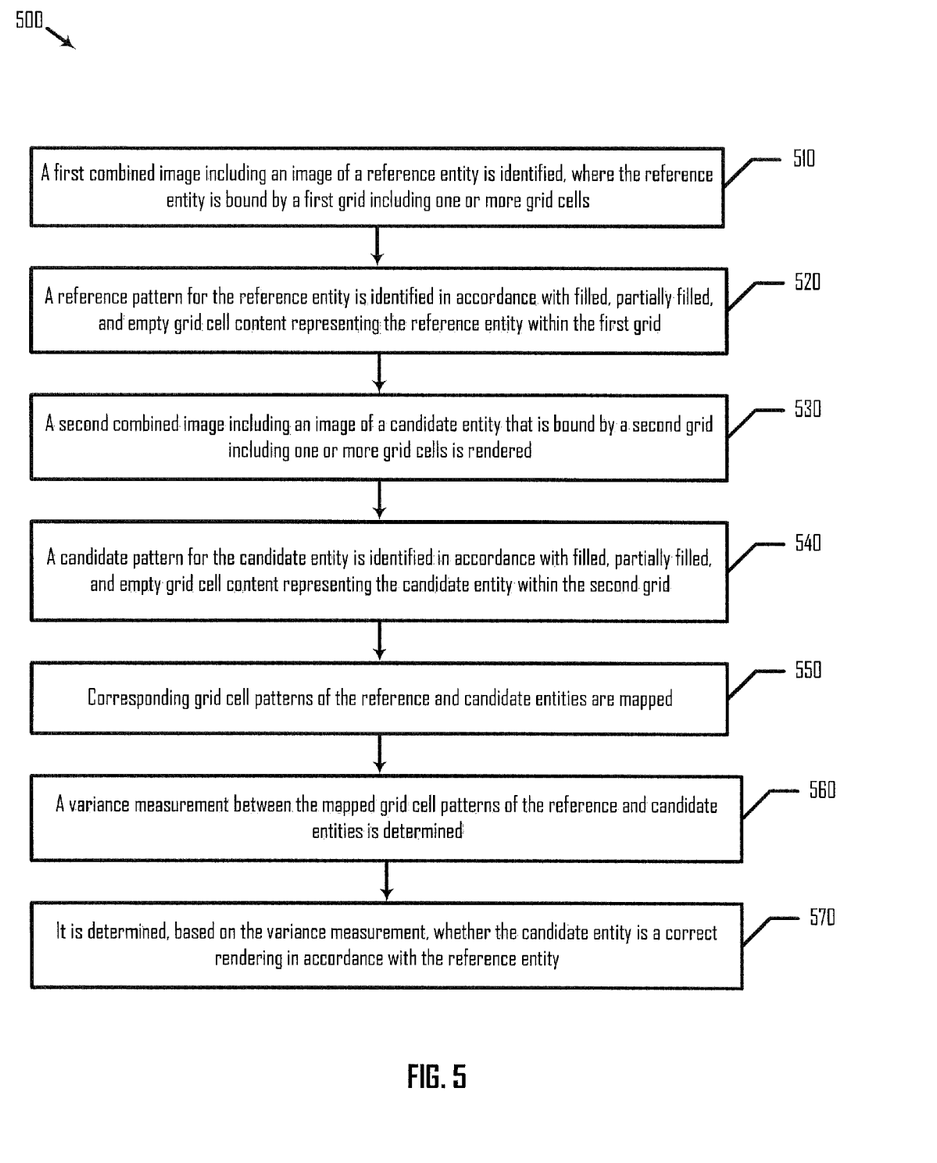
FIG. 5 is a flowchart illustrating a method of determining a correct rendering of a candidate entity of a candidate font set, according to an embodiment.

FIG. 5 is a flowchart illustrating a method of determining a correct rendering of a candidate entity of a candidate font set, according to an embodiment. Method 500 is not meant to be limiting and may be used in other applications.

Method 500 includes blocks 510-570. In a block 510, a first combined image including an image of a reference entity is identified, where the reference entity is bound by a first grid including one or more grid cells. In an example, overlay module 128 identifies a combined image 308 including image 302 of reference entity 304, where reference entity 304 is bound by grid 306 including one or more grid cells. In a block 520, a reference pattern for the reference entity is identified in accordance with filled, partially filled, and empty grid cell content representing the reference entity within the first grid. In an example, identification module 130 identifies a reference pattern for reference entity 304 in accordance with filled, partially filled, and empty grid cell content representing reference entity 304 within grid 306.

In a block 530, a second combined image including an image of a candidate entity that is bound by a second grid including one or more grid cells is rendered. In an example, rendering engine 122 renders combined image 408 including image 402 of candidate entity 404 that is bound by grid 406 including one or more grid cells. In a block 540, a candidate pattern for the candidate entity is identified in accordance with filled, partially filled, and empty grid cell content representing the candidate entity within the second grid. In an example, identification module 130 identifies a candidate pattern for candidate entity 404 in accordance with filled, partially filled, and empty grid cell content representing candidate entity 404 within grid 406.

In a block 550, corresponding grid cell patterns of the reference and candidate entities are mapped. In an example, identification module 130 maps corresponding grid cell patterns of reference entity 304 and candidate entity 404. In a block 560, a variance measurement between the mapped grid cell patterns of the reference and candidate entities is determined. In an example, validation module 126 determines a variance measurement between the mapped grid cell patterns of reference entity 304 and candidate entity 404. In a block 570, it is determined, based on the variance measurement, whether the candidate entity is a correct rendering in accordance with the reference entity. In an example, validation module 126 determines, based on the variance measurement, whether candidate entity 404 is a correct rendering in accordance with reference entity 304.

It is also understood that additional processes may be performed before, during, or after blocks 510-570 discussed above. It is also understood that one or more of the blocks of method 500 described herein may be omitted, combined, or performed in a different sequence as desired.

V. Example Computing System

Figure 6:
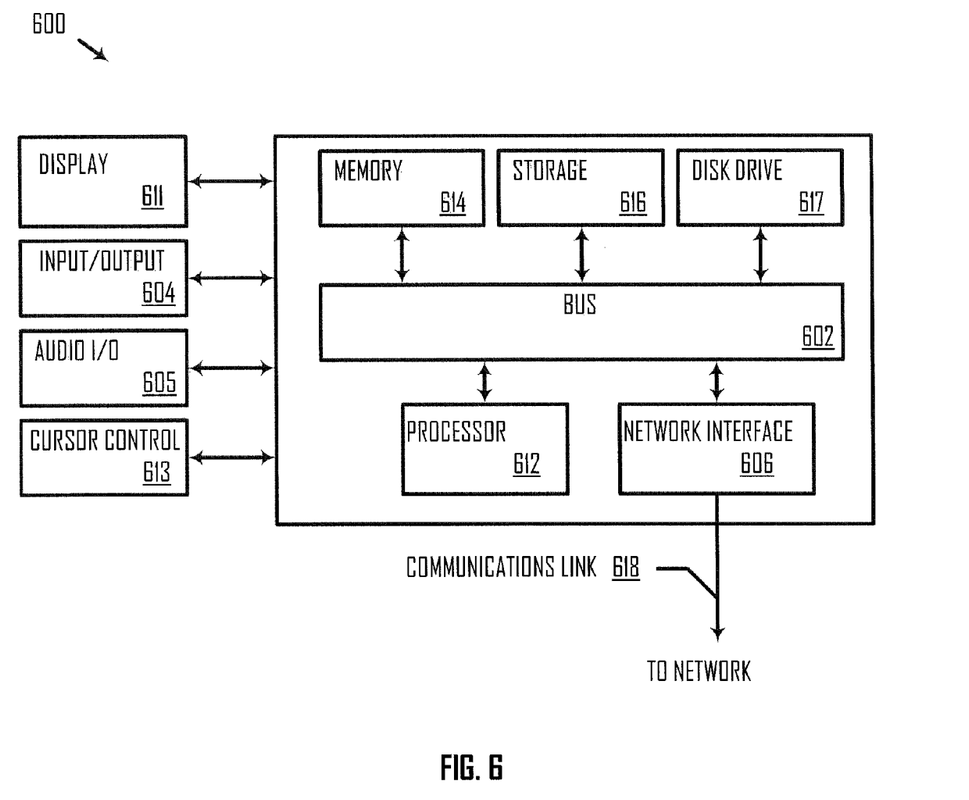
FIG. 6 is a block diagram of a computer system suitable for implementing one or more embodiments of the present disclosure.

FIG. 6 is a block diagram of a computer system 600 suitable for implementing one or more embodiments of the present disclosure. In various implementations, computing device 110 may include a client or a server computing device. The client or server computing device may include one or more processors. The client or server computing device may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown).

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component such as a display 611, and an input control such as a cursor control 613 (such as a keyboard, keypad, mouse, etc.). An optional audio input/output component 605 may also be included to allow a user to use voice for inputting information by converting audio signals into information signals. Audio I/O component 605 may allow the user to hear audio. A transceiver or network interface 606 transmits and receives signals between computer system 600 and other devices via a communication link 618 to a network. In an embodiment, the transmission is wireless, although other transmission mediums and methods may also be suitable. A processor 612, which may be a microcontroller, digital signal processor (DSP), or other processing component, processes these various signals, such as for display on computer system 600 or transmission to other devices via communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer readable medium, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 614, and transmission media includes coaxial cables, copper wire, and fiber optics, including wires that include bus 602. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable media. It is also contemplated that the application software identified herein may be implemented using one or more general purpose or specific purpose computers and/or computer systems, networked and/or otherwise. Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

I claim:

1. A method of determining a correct rendering of a candidate entity, the method comprising:
   identifying, by one or more processors, a first combined image including an image of a reference entity, wherein the reference entity is bound by a first grid including one or more grid cells;
   identifying a reference pattern for the reference entity in accordance with filled, partially filled, and empty grid cell content representing the reference entity within the first grid;
   rendering a second combined image including an image of a candidate entity on a display coupled to a device, wherein the candidate entity is bound by a second grid including one or more grid cells;
   identifying a candidate pattern for the candidate entity in accordance with filled, partially filled, and empty grid cell content representing the candidate entity within the second grid;
   mapping corresponding grid cell patterns of the reference and candidate entities;
   determining a variance measurement between the mapped grid cell patterns of the reference and candidate entities; and
   determining, based on the variance measurement, whether the candidate entity is a correct rendering in accordance with the reference entity.

2. The method of claim 1, wherein the determining a variance measurement includes:
   extracting one or more attributes from the first combined image in accordance with the reference pattern;
   extracting one or more attributes from the second combined image in accordance with the candidate pattern; and
   comparing the one or more extracted attributes from the first combined image with the one or more extracted attributes from the second combined image.

3. The method of claim 2, wherein the determining a variance measurement further includes identifying one or more points of similarity between the reference and candidate patterns in accordance with the comparing.

4. The method of claim 2, wherein the determining a variance measurement further includes identifying one or more points of dissimilarity between the reference and candidate patterns in accordance with the comparing.

5. The method of claim 2, wherein the determining a variance measurement further includes overlaying the first combined image over the second combined image, wherein the comparing includes comparing, in accordance with the overlaying, the one or more extracted attributes from the first combined image with the one or more extracted attributes from the second combined image.

6. The method of claim 2, wherein the determining a variance measurement further includes overlaying the second combined image over the first combined image, wherein the comparing includes comparing, in accordance with the overlaying, the one or more extracted attributes from the first combined image with the one or more extracted attributes from the second combined image.

7. The method of claim 1, wherein an attribute is at least one selected from a group including font family, font weight, font width, font style, font size, font adjustment, font relative sizing, font stretch, kerning, and ligatures.

8. The method of claim 1, wherein the image of the reference entity is produced by a source known to produce a correct image of an entity corresponding to the reference entity.

9. The method of claim 1, further including:
   determining a second image including the image of the reference entity overlaid on the first grid;
   digitizing the second image to determine the first combined image;
   determining a third image including the image of the candidate entity overlaid on the second grid; and
   digitizing the third image to determine the second combined image.

10. The method of claim 9, further including:
    using an optical character recognition program, identifying a digitized form of the candidate entity in the third image;
    estimating a noise of the digitized form of the candidate entity; and
    determining, based on the estimating, whether the second combined image is useful.

11. The method of claim 1, wherein the determining a variance measurement includes using the Locii algorithm.

12. The method of claim 1, wherein the first combined image includes an image of a reference font set including one or more reference entities and the second combined image includes an image of a candidate font set including one or more candidate entities, and wherein the reference font set includes text characters of an alphabet of a language, the method further including:

for each text character of the alphabet, determining whether the respective text character of the alphabet has a corresponding candidate entity in the candidate font set; and when a text character of the alphabet is determined to not have a corresponding candidate entity in the candidate font set, preparing a report indicating that the candidate font set is incomplete.

13. The method of claim 1, further including:
preparing a report in accordance with the determining whether the candidate entity is a correct rendering.

14. A system for determining a correct rendering of a candidate entity, the system comprising:

a memory storing one or more reference patterns;

a rendering engine that renders a first combined image including an image of a reference entity and that renders a second combined image including an image of a candidate entity, wherein the reference entity is bound by a first grid including one or more grid cells and the candidate entity is bound by a second grid including one or more grid cells;

a pattern module that reads the memory, identifies from the read memory a reference pattern for the reference entity in accordance with filled, partially filled, and empty grid cell content representing the reference entity within the first grid, that identifies a candidate pattern for the candidate entity in accordance with filled, partially filled, and empty grid cell content representing the candidate entity within the second grid, and that maps corresponding grid cell patterns of the reference and candidate entities; and a validation module that determines a variance measurement between the mapped grid cell patterns of the reference and candidate entities and determines, based on the variance measurement, whether the candidate entity is a correct rendering in accordance with the reference entity.

15. The system of claim 14, wherein the validation module extracts one or more attributes from the first combined image in accordance with the reference pattern, extracts one or more attributes from the second combined image in accordance with the candidate pattern, compares the one or more extracted attributes from the first combined image with the one or more extracted attributes from the second combined image, and identifies one or more points of similarity or dissimilarity between the reference and candidate patterns in accordance with the comparing.

16. The system of claim 14, wherein the validation module overlays the first combined image over the second combined image or overlays the second combined image over the first combined image to compare the one or more extracted attributes from the first combined image with the one or more extracted attributes from the second combined image.

17. The system of claim 14, further including:
a rendering engine that renders a second image including the image of the reference entity overlaid on the first grid and that renders a third image including the image of the candidate entity overlaid on the second grid; and an optical character recognition program that digitizes the second image to determine the first combined image and that digitizes the third image to determine the second combined image.

18. The system of claim 14, further including:
a report module that prepares a report in accordance with the determination of whether the candidate entity is a correct rendering.

19. The system of claim 14, wherein the first combined image includes an image of a reference font set including one or more reference entities and the second combined image includes an image of a candidate font set including one or more candidate entities, wherein the reference font set includes text characters of an alphabet of a language, and wherein for each text character of the alphabet, the validation module determines whether the respective text character of the alphabet has a corresponding candidate entity in the candidate font set and when a text character of the alphabet is determined to not have a corresponding candidate entity in the candidate font set, the validation module 126 prepares a report indicating that the candidate font set is incomplete.

20. A machine-readable medium comprising a plurality of machine-readable instructions that when executed by one or more processors is adapted to cause the one or more processors to perform a method comprising:

identifying a first combined image including an image of a reference entity, wherein the reference entity is bound by a first grid including one or more grid cells;

identifying a reference pattern for the reference entity in accordance with filled, partially filled, and empty grid cell content representing the reference entity within the first grid;

rendering a second combined image including an image of a candidate entity, wherein the candidate entity is bound by a second grid including one or more grid cells;

identifying a candidate pattern for the candidate entity in accordance with filled, partially filled, and empty grid cell content representing the candidate entity within the second grid;

mapping corresponding grid cell patterns of the reference and candidate entities;

determining a variance measurement between the mapped grid cell patterns of the reference and candidate entities; and determining, based on the variance measurement, whether the candidate entity is a correct rendering in accordance with the reference entity.

* * * * *